US009418511B2

(12) United States Patent
Pau et al.

(10) Patent No.: US 9,418,511 B2
(45) **Date of Patent: *Aug. 16, 2016**

(54) PLAYER CHOICE GAME FEATURE

(71) Applicant: Aristocrat Technologies Australia Pty Limited, North Ryde, NSW (AU)

(72) Inventors: Edgar Pau, Newington (AU); Colin Fong, Penshurst (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,413

(22) Filed: Jan. 10, 2014

(65) Prior Publication Data

US 2014/0128151 A1 May 8, 2014

Related U.S. Application Data

(63) Continuation of application No. 13/553,473, filed on Jul. 19, 2012, now Pat. No. 8,628,395, which is a continuation of application No. 12/831,011, filed on Jul. 6, 2010, now Pat. No. 8,303,395, which is a continuation of application No. 09/965,605, filed on Sep. 27, 2001, now Pat. No. 7,775,869.

(30) Foreign Application Priority Data

Oct. 5, 2000 (AU) ...................................... PR0579

(51) Int. Cl.
*A63F 13/00* (2014.01)
*G07F 17/32* (2006.01)

(52) U.S. Cl.
CPC ........ *G07F 17/3244* (2013.01); *G07F 17/3262* (2013.01)

(58) Field of Classification Search
CPC ............ A63F 2300/10; A63F 2300/20; A63F 23/203; A63F 2300/30; A63F 2300/305; A63F 2300/307; A63F 2300/60; A63F 2300/6009; A63F 2300/6036; A63F 2300/63; A63F 1/00
See application file for complete search history.

(56) References Cited

U.S. PATENT DOCUMENTS

| | | | |
|---|---|---|---|
| 4,448,419 | A | 5/1984 | Telnaes |
| 5,205,555 | A | 4/1993 | Hamano |
| 5,401,023 | A | 3/1995 | Wood |
| 5,456,465 | A | 10/1995 | Durham |
| 5,788,573 | A | 8/1998 | Baerlocher et al. |

(Continued)

OTHER PUBLICATIONS

Aristocrat, How to Play Guide, "Inca Sun" flyer, Sep. 11, 2000.

*Primary Examiner* — Tramar Harper
*Assistant Examiner* — Jeffrey Wong
(74) *Attorney, Agent, or Firm* — McAndrews, Held & Malloy, Ltd.

(57) ABSTRACT

A gaming machine has display means and a game control means. A game is played in which one or more random events are displayed on the display means and, if a predefined winning event occurs, the machine awards a prize. On the occurrence of a predefined event, the player is offered a choice of two or more different prize sets, each containing a plurality of prize outcomes. The prize is drawn from the prize set or sets selected. The sets of prizes may be presented on segments of wheels that can spin before stopping randomly on a segment which defines the prize outcome. Alternatively the sets of prizes are presented on the faces of dice which are arranged to spin before stopping with the front face of the die defining the prize won.

10 Claims, 7 Drawing Sheets

(56) References Cited

U.S. PATENT DOCUMENTS

| | | | |
|---|---|---|---|
| 5,855,514 | A | 1/1999 | Kamille |
| 5,964,463 | A | 10/1999 | Moore, Jr. |
| 6,062,981 | A | 5/2000 | Luciano, Jr. |
| 6,068,552 | A | 5/2000 | Walker et al. |
| 6,117,009 | A | 9/2000 | Yoseloff |
| 6,159,096 | A | 12/2000 | Yoseloff |
| 6,168,520 | B1 | 1/2001 | Baerlocher et al. |
| 6,173,955 | B1 | 1/2001 | Perriet et al. |
| 6,174,235 | B1 | 1/2001 | Walker et al. |
| 6,183,361 | B1 | 2/2001 | Cummings et al. |
| 6,203,429 | B1 | 3/2001 | Demar et al. |
| 6,213,876 | B1 | 4/2001 | Moore, Jr. |
| 6,231,442 | B1 | 5/2001 | Mayeroff |
| 6,309,300 | B1 | 10/2001 | Glavich |
| 6,315,660 | B1 | 11/2001 | DeMar et al. |
| 6,331,143 | B1 | 12/2001 | Yoseloff |
| 6,439,993 | B1 | 8/2002 | O'Halloran |
| 6,450,883 | B1 * | 9/2002 | O'Halloran ..................... 463/16 |
| 6,488,505 | B1 | 12/2002 | Hightower |
| 6,511,375 | B1 | 1/2003 | Kaminkow |
| 6,569,015 | B1 | 5/2003 | Baerlocher et al. |
| 6,666,767 | B1 | 12/2003 | Dayan |
| 6,743,102 | B1 | 6/2004 | Fiechter et al. |
| 6,776,711 | B1 * | 8/2004 | Baerlocher ............. G07F 17/32 463/16 |
| 6,802,774 | B1 | 10/2004 | Carlson et al. |
| 6,855,052 | B2 | 2/2005 | Weiss et al. |
| 6,857,959 | B1 | 2/2005 | Nguyen |
| 7,011,581 | B2 | 3/2006 | Cole et al. |
| 7,641,548 | B2 | 1/2010 | Packes, Jr. et al. |

* cited by examiner

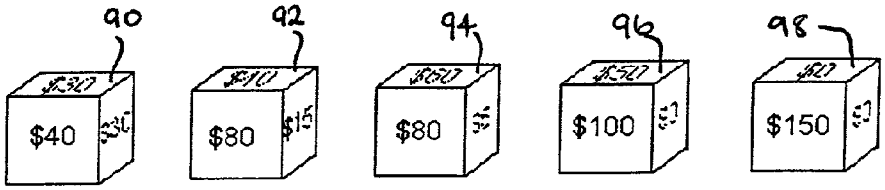
| FACE # | DICE 1 | DICE 2 | DICE 3 | DICE 4 | DICE 5 |
|---|---|---|---|---|---|
| 1 | $40 | $80 | $80 | $100 | $150 |
| 2 | $30 | $40 | $60 | $50 | $0 |
| 3 | $30 | $15 | $5 | $0 | $0 |
| 4 | $20 | $8 | $3 | $0 | $0 |
| 5 | $20 | $5 | $2 | $0 | $0 |
| 6 | $10 | $2 | $0 | $0 | $0 |
| AVE. | **$25** | **$25** | **$25** | **$25** | **$25** |
FIGURE 8
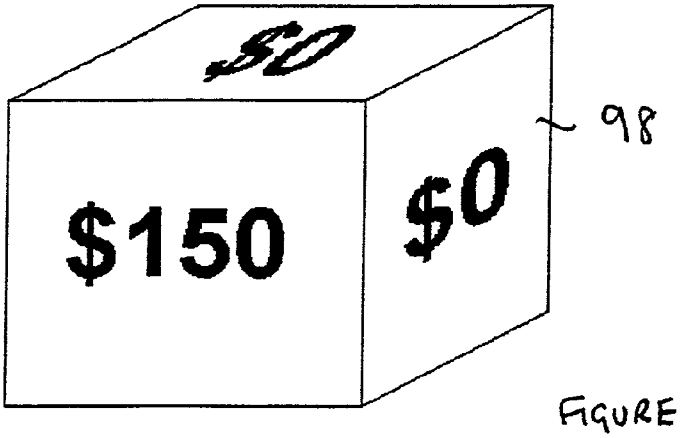
FIGURE 9
PRESS START TO ROLL THE DIE
FIGURE 9

PLAYER CHOICE GAME FEATURE

RELATED APPLICATIONS

This application is a continuation of U.S. application Ser. No. 13/553,473, filed Jul. 19, 2012, which is a continuation of U.S. application Ser. No. 12/831,011, filed Jul. 6, 2010, now U.S. Pat. No. 8,303,395, which is a continuation of U.S. application Ser. No. 09/965,605 filed Sep. 27, 2001, now U.S. Pat. No. 7,775,869, which claims priority to Australia Patent Application No. PR0579, filed Oct. 5, 2000. The above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to a gaming machine. More particularly, the invention relates to a gaming machine and to an improvement to a game played on such a gaming machine.

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

BRIEF SUMMARY OF THE INVENTION

In a first aspect of the present invention, there is provided a gaming machine having a display means and a game control means arranged to control images displayed on the display means, the game control means being arranged to play an underlying game wherein one or more random events are caused to be displayed on the display means and, if a predefined winning event occurs, the machine awards a prize, the gaming machine being characterised in that on the occurrence of a predefined event, the player is offered a choice of two or more different prize sets, each set containing a plurality of prize outcomes, from which prize sets a prize is to be drawn and awarded to the player, typically by a random process, wherein the prize is drawn from the prize set or sets selected by the player.

The prize sets have different prizes in them, and although each prize set may have duplicates of the prizes in the prize set and may repeat the prizes in the second or further prize sets, overall the prize sets will not be identical to one another.

The different prizes in the prize sets will effect the volatility of the feature game. One or more of the prize sets may include non winning prize outcomes. Preferably, including the non winning prize outcomes, each prize set will have the same number of potential outcomes.

Typically, the prize sets vary from a relatively even distribution of relatively small prizes to sets where one or more large prizes may be won but which include a relatively large number of zero or consolation prize outcomes. Hence, if the player is conservative, that will permit them to choose a prize set having a set of possible outcomes that will be guaranteed or almost guaranteed to result in that player winning a prize, even if that prize may be relatively small. A more aggressive player may choose a prize set which presents an opportunity of winning much larger prizes, but a much greater chance that the player will win nothing at all or only a consolation prize.

The method by which the game feature is triggered, is not significant and might typically be the occurrence of a special combination during the base game or alternatively the triggering may occur at random.

The type of underlying game is not critical to the invention and could be a spinning reel game, a card game, keno, bingo, pachinko or any style of gambling game.

In one embodiment, each prize set is presented to a player differently. For example, one set may take the form of a wheel, another set may take the form of a board game, and another set a bag of tricks. However, in the preferred embodiment, the sets of prizes are represented by wheels that can spin (or more typically simulate spinning) to stop randomly on a segment which defines the prize outcome won by the player.

In an alternative embodiment, a plurality of representations of board games are provided. The player choses which board they wish to play. A random selection such as a dice roll will indicate the number of positions around the selected board that the player will move with the square on which the player lands being the square that provides the prize outcome.

BRIEF DESCRIPTION OF SEVERAL VIEWS OF THE DRAWINGS

The invention is now described by way of example with reference to the accompanying diagrammatic drawings in which:

FIG. 8 illustrates a further embodiment of the present invention and in particular shows a screen which appears on a gaming machine following the triggering of the game feature of the present invention; and FIG. 9 shows a screen after the player has selected the die of their choice from the screen of FIG. 8.

DETAILED DESCRIPTION OF THE INVENTION

Figure 1:
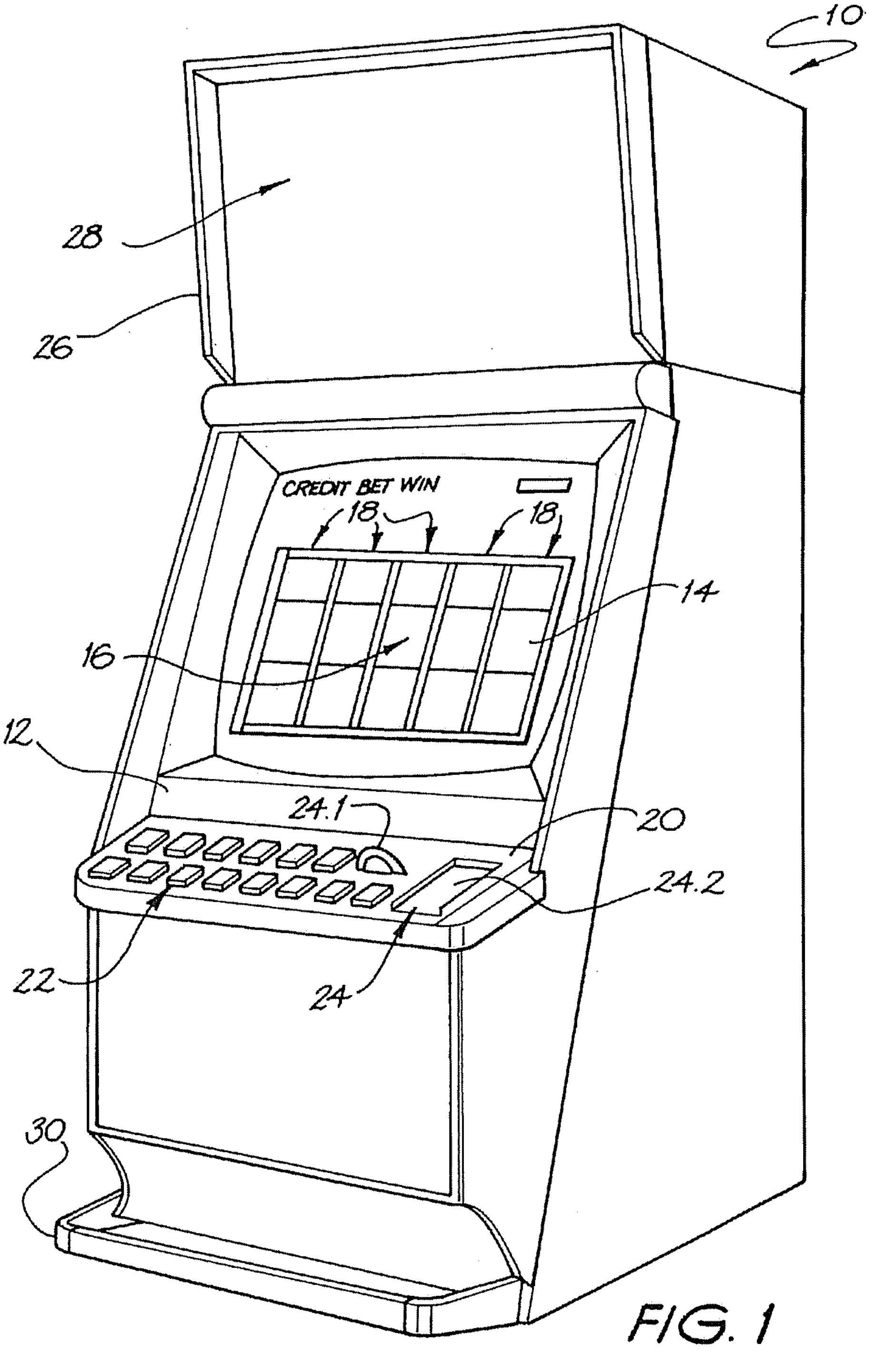
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The preferred form of a base game of the game 16 is a spinning reel game which simulates the rotation of a number of spinning reels 18. It will, however, be appreciated that the invention is equally applicable to other types of base games such as card games, pachinko or ball games such as Bingo or Keno, or any type of gambling game. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
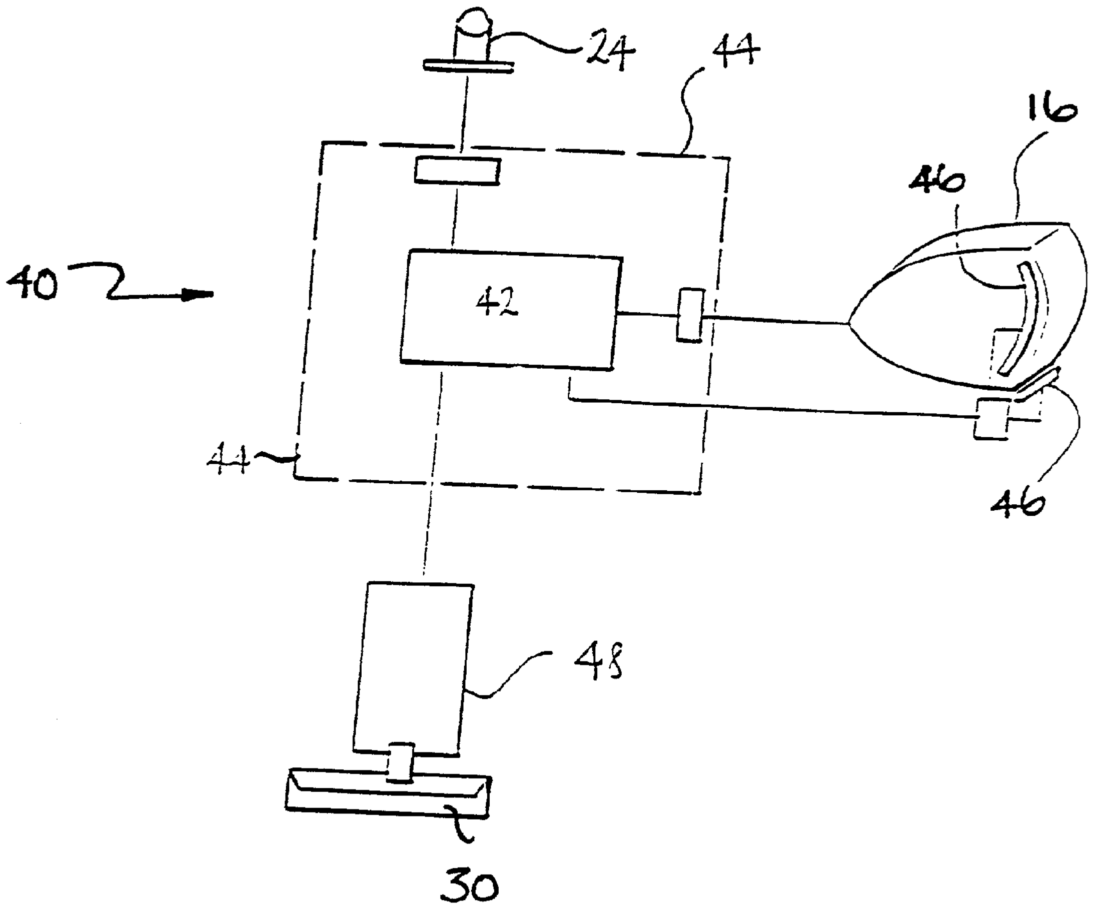
FIG. 2 shows a block diagram of a control circuit of the gaming machine.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen 16. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 44 drives a payout mechanism 48 which, for example, may be a coin hopper for feeding coins to the coin tray 30 to pay a prize once a predetermined combination of symbols carried on the reels 18 appears on the screen 16 or some other prize winning event occurs.

The player plays the base game, which, as discussed above in the described embodiment, is a video reel game (a video simulation of spinning reels). The novel game feature of the present invention relates to a feature game which is triggered on the occurrence of a predetermined combination of symbols on the display, or at random, or by some other process.

Figure 3:
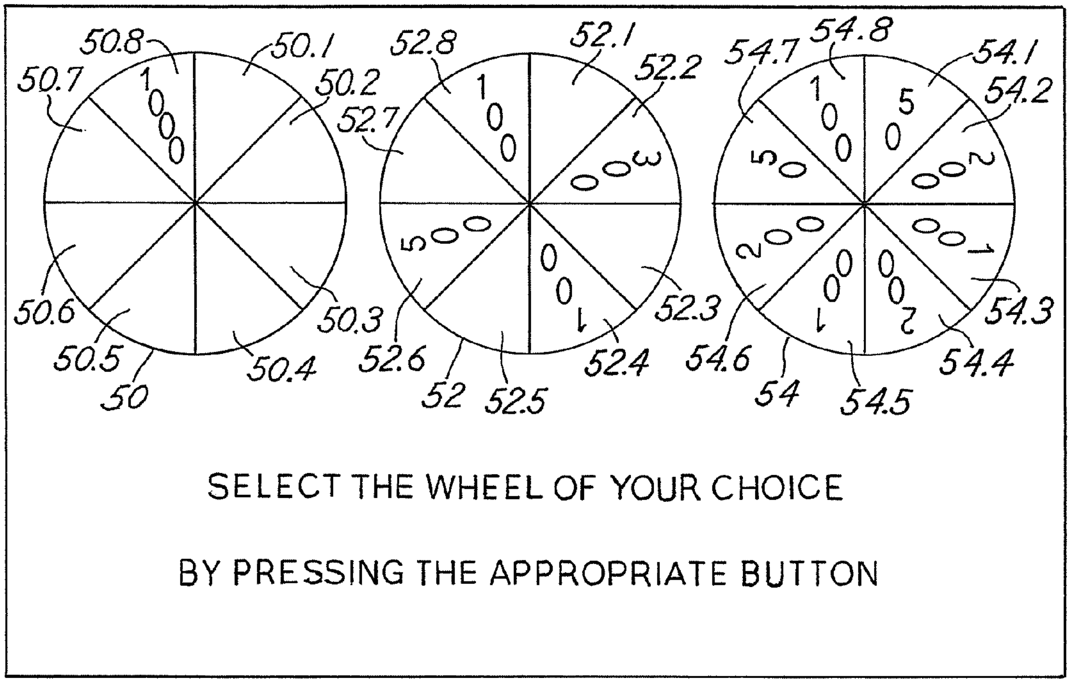
FIG. 3 shows a screen which appears on a gaming machine following the triggering of the game feature of the present invention.
Figure 4:
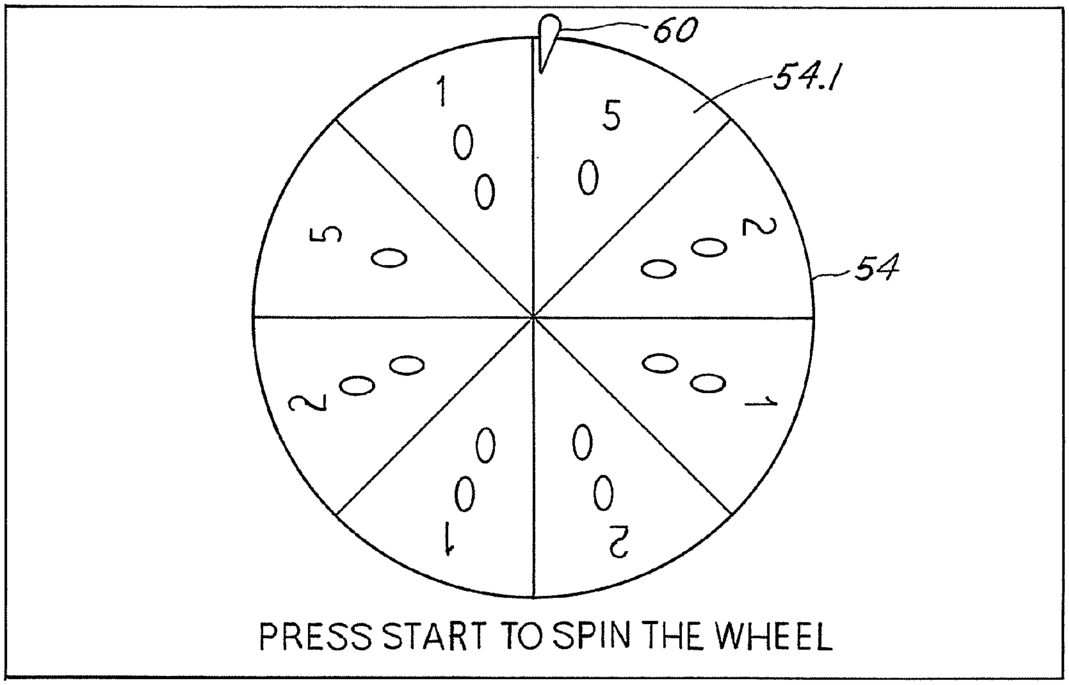
FIG. 4 shows a screen which appears after the player has selected the wheel of their choice from the screen shown in FIG. 3.

Referring to FIGS. 3 and 4, in one embodiment of the present invention, on the occurrence of the triggering event, the screen of the gaming machine changes to show three wheels 50, 52, 54. Each wheel has eight segments 50.1, 50.2, . . . 50.8; 52.1, 52.2, . . . 52.8; 54.1, 54.2, . . . 54.8 respectively. The arrangement of potential prizes, in the described embodiment (credits) on the wheels, affect the volatility of the game feature. Thus, for example, the spinning wheel 50 which provides the potentially greatest reward to the player of 1000 credits (segment 50.8), also provides seven zero outcomes (50.1 to 50.7), so it is the most volatile wheel. Wheel 52 offers four prizes and four zero outcomes with the biggest prize being 500 credits (segment 52.6). With wheel 54, the player is guaranteed a prize. The maximum prize available is 200 credits (segment 54.6), and the minimum guaranteed prize is 50 credits (segments 54.7 and 54.4). The total theoretical return to the player, is preferably the same regardless of the wheel the player chooses. For example, assuming that the wheel spin is not weighted, i.e. that there is an equal probability of any of the sectors being selected as a prize outcome, all three wheels 50, 52, 54 shown in FIG. 3 should theoretically provide an average of 1000 credits to a player for every eight game features that are played. Once the player has selected a wheel the wheel is enlarged and shown alone on the screen. FIG. 4 illustrates an enlarged wheel 54 which appears after that wheel has been selected. When the player presses the start button, the wheel then simulates spinning and the prize that is shown in the segment indicated by the pointer 60 after the wheel stops spinning is the prize outcome that is awarded to the player.

Other types of prizes other than just fixed credits, may be awarded, including free games, mystery prizes, "next win multiplied by five" etc.

Figure 5:
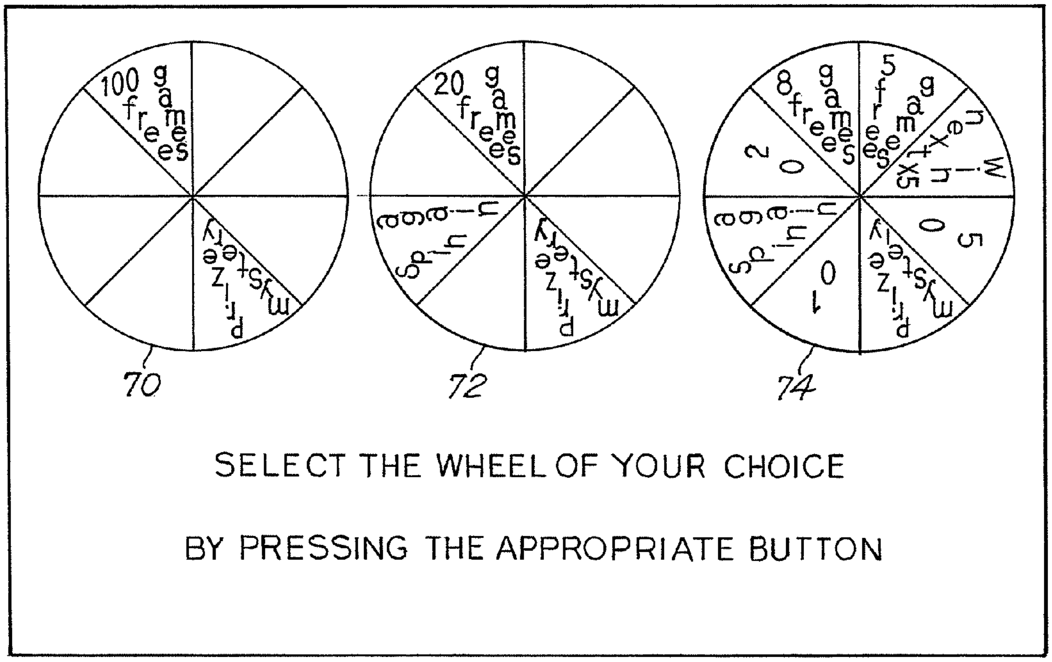
FIG. 5 shows an alternative selection of wheels to that shown in FIG. 3.

FIG. 5 shows an exemplary display showing the wheels having a selection of different prizes. As shown, wheel 70 gives the option of 100 free games or a mystery prize with six no prize outcomes. Wheel 72 provides a mystery prize, or 20 free games, or an opportunity for the player to spin again, with five no prize outcomes. Wheel 74 provides a prize in each segment including "spin again", 10, 20, or 50 credits, 5 or 8 free games, a mystery prize and the player's "next win multiplied by 5". A feature of the wheel selection shown in FIG. 5 is that because very different prizes are provided on each reel it is more difficult for a player to work out which reel, if any, offers him the best odds of winning. This makes the choice more challenging and stimulating for the player.

Figure 6:
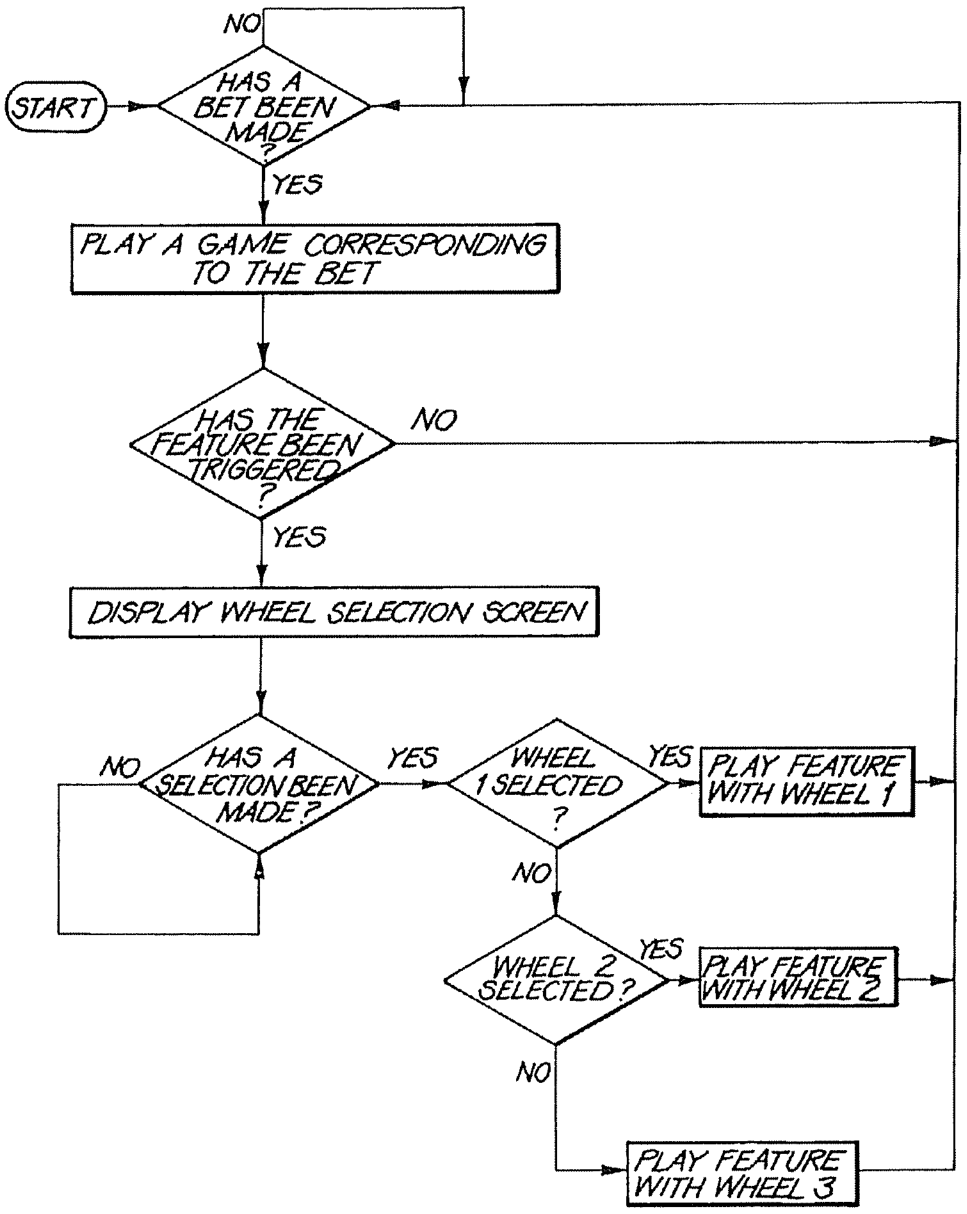
FIG. 6 shows a flow chart diagram for the described embodiment of the invention.

FIG. 6 shows a flow chart for the described embodiment of the invention.

Figure 7:
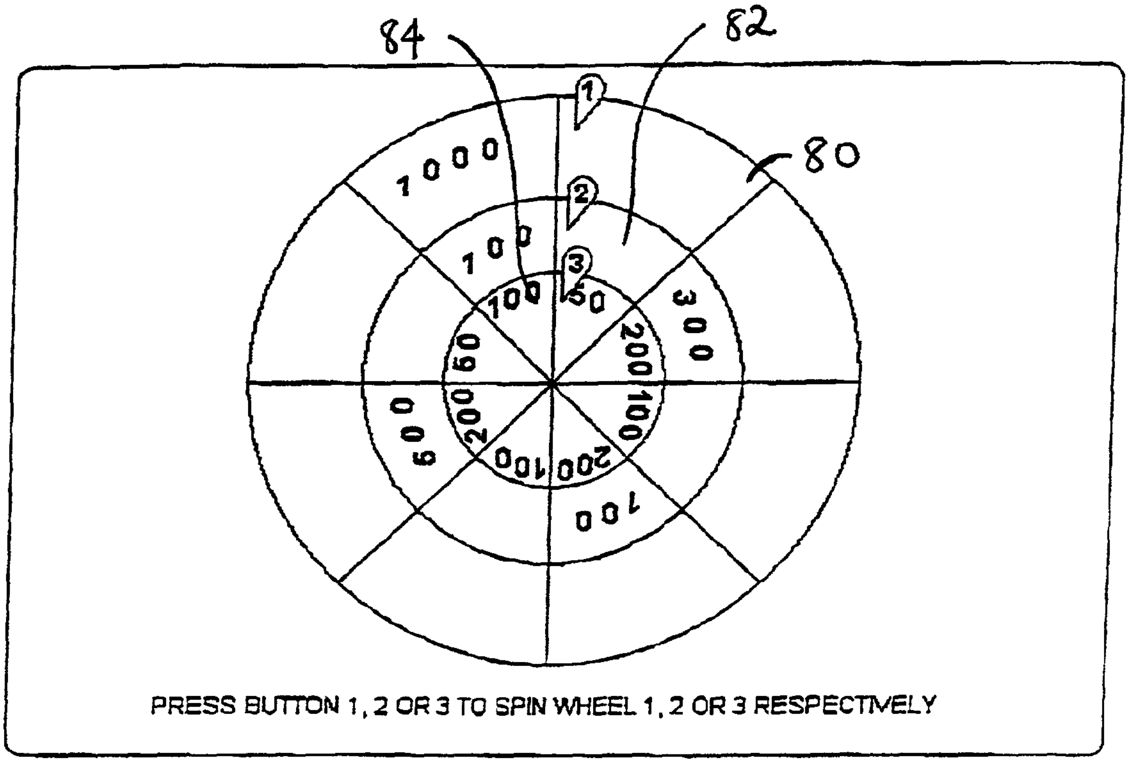
FIG. 7 shows a screen display of a yet further variant of the invention.

In an alternative embodiment, illustrated in FIG. 7, three wheels 80, 82, 84, could be displayed concentrically instead of the side by side arrangement shown in FIG. 3. In this case a player presses a button to indicate whether they wish to spin wheel 1, 2 or 3. In this case the display does not go to another screen as with the first embodiment—the chosen wheel just spins while the non-selected wheels remain stationary.

In a variant to the inventions described above the player may be allowed to select more than one prize set, as long as the number of sets chosen by the player is less than the total number of available prize sets. For example for the screens shown in FIGS. 3, 5 and 7 the player may be required to chose two wheels to spin. In the embodiments shown in FIGS. 3 and 5 the chosen wheels may spin one after the other and the prizes may be accumulated from the two wheel spins. In the version shown in FIG. 7 both chosen wheels may spin simultaneously, leaving the non-selected wheel stationary. Again the prize outcomes on both of the spun wheels are paid.

FIGS. 8 and 9 show a yet further embodiment of the present invention. In this embodiment instead of wheels the various prizes are displayed on the faces of a 3-D object such as a die. FIG. 6 illustrates a selection screen in which the player is offered the choice of five dice 90, 92, 94, 96, or 98. As only three faces of each die are visible at any one time underneath each die there is a list of the prizes shown on each face of that die. the list also gives the average (mean) win per spin of that die which for all the dice is $25, although the volatility of the dice differ from one another, with die 90 being the least volatile and die 98 being the most volatile with a single winning face showing a prize outcome of $150. The player uses buttons or touches the screen to select one of the dice. The chosen die then is shown enlarged in a further screen display such as is shown in FIG. 9. When the player presses the start button the die will animate and start spinning or turning before stopping to reveal a prize outcome. In the embodiment shown in FIG. 9 the player has chosen die 98 and the Figure shows the die prior to spin of the die.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for use with a gaming machine having a credit input mechanism configured to receive a physical item associated with a monetary value for establishing a credit balance, the credit balance being increasable and decreasable based at least on wagering activity, a game controller, a payout mechanism configured to cause a payout associated with the credit balance, and a plurality of manually operable selectors, the method comprising:

in accord with having established the credit balance via the credit input mechanism receiving the physical item, generating via the game controller a plurality of award sets, each of which comprises a plurality of outcomes, each of the outcomes being either an integer having a positive value or a non-winning outcome having no value, and each of said award sets having at least one of said outcomes being an integer of positive value, wherein a total number of the integers having a positive value in any one of the award sets is not equal to a total number of the integers having a positive value in any other of the award sets, and wherein a sum total of the positive value for all integers in any one of the award sets is equal to a sum total of the positive value for all integers in any other of the award sets;

designating via the game controller a number of said selectors to a corresponding number of said award sets;

selecting via the game controller outcomes from said designated number of award sets;

accumulating via the game controller all selected positive values of the integers from the selected outcomes; and awarding via the payout mechanism game play credits equaling said accumulated positive value.

2. The method as claimed in claim 1, wherein the highest value positive integer of one of the award sets is at least twice as large as the highest value positive integer of another of the award sets.

3. The method as claimed in claim 1, wherein within at least one of the award sets there is at least a factor of four difference between the highest and lowest values of said positive value integers.

4. The method as claimed in claim 1, wherein only one of the award sets has a single positive value integer.

5. The method as claimed in claim 4, wherein only one of the award sets has no said non-winning outcomes.

6. A gaming machine comprising:

a credit input mechanism configured to receive a physical item associated with a monetary value for establishing a credit balance, the credit balance being increasable and decreasable based at least on wagering activity;

a plurality of selectors;

an electronic game controller configured to, in accord with having established the credit balance via the credit input mechanism receiving the physical item, maintain a plurality of award sets each of which comprises a plurality of outcomes, each of said award sets corresponding to respective ones of said selectors, each of the outcomes being either an integer having a positive value or a non-winning outcome having no value, and each of said award sets having at least one of said outcomes being an integer of positive value, wherein a total number of the integers having a positive value in any one of the award sets is not equal to a total number of the integers having a positive value in any other of the award sets, and wherein a sum total of the positive value for all integers in any one of the award sets is equal to a sum total of the positive value for all integers in any other of the award sets; and a player interface configured to receive a designation of a number of said selectors to a corresponding number of said award sets;

and wherein the electronic game controller is further configured to select outcomes from said designated number of award sets, accumulate all selected positive values of the integers from the selected outcomes, and a payout mechanism configured to award game play credits equaling said accumulated positive value.

7. The gaming machine as claimed in claim 6, wherein the highest value positive integer of one of the award sets is at least twice as large as the highest value positive integer of another of the award sets.

8. The gaming machine as claimed in claim 6, wherein within at least one of the award sets there is at least a factor of four difference between the highest and lowest values of said positive value integers.

9. The gaming machine as claimed in claim 8, wherein one only of the award sets has a single said positive value integer.

10. The gaming machine as claimed in claim 9, wherein one only of the award sets has no said non-winning outcomes.

* * * * *